United States Patent [19]

Wu

[11] Patent Number: 5,344,799
[45] Date of Patent: Sep. 6, 1994

[54] FORMABLE CERAMIC COMPOSITIONS AND METHOD OF USE THEREFOR

[75] Inventor: Shy-Hsien Wu, Horseheads, N.Y.

[73] Assignee: Corning Incorporated, Corning, N.Y.

[21] Appl. No.: 132,841

[22] Filed: Oct. 7, 1993

Related U.S. Application Data

[63] Continuation-in-part of Ser. No. 990,321, Dec. 14, 1992, abandoned.

[51] Int. Cl.$^5$ .................... C03C 11/00; C04B 38/00
[52] U.S. Cl. ........................ 501/80; 501/99; 501/9; 501/5; 501/2; 501/118; 501/119; 501/120; 501/128; 501/153; 264/43; 264/177.12; 264/176.1
[58] Field of Search ............. 501/2, 80, 9, 118, 119, 501/120, 128, 153, 99, 5; 264/177.12, 176.1, 43

[56] References Cited

U.S. PATENT DOCUMENTS

| | | | |
|---|---|---|---|
| 4,551,295 | 11/1985 | Gardner et al. | 264/177.11 |
| 4,853,350 | 8/1989 | Chen et al. | 501/9 |
| 5,183,607 | 2/1993 | Miyahara | 264/177.11 |

*Primary Examiner*—Karl Group
*Assistant Examiner*—C. M. Bonner
*Attorney, Agent, or Firm*—L. Rita Quatrini

[57] ABSTRACT

A plastically deformable mixture and method for making a body from the mixture are disclosed. The mixture is composed of powder materials, which when fired form as predominant phases: ceramic, glass-ceramic, glass, and combinations thereof, 0 to an effective amount of burnout agent, water, organic binder which can be cellulose ether, cellulose ether derivatives or combinations thereof, and hydrophilic and hydrophobic additives, to increase the wettability and/or lubricity of the mixture. One advantageous composition for ram extrusion is composed of ceramic-forming powders, water, and in percent by weight based on the powders, about 2% to 8% organic binder which can be methylcellulose, methylcellulose derivatives, and combinations thereof, about 0.3% to 1.0% sodium stearate, and about 0.5% to 2.0% oleic acid. Another such advantageous composition is composed of ceramic-forming powders, about 25% to 35% by weight graphite based on the powder material, as a burnout agent, water, and in percent by weight based on the powders and the burnout agent, about 2% to 8% organic binder which can be methylcellulose, methylcellulose derivatives, and combinations thereof, about 0.5% to 2.5% sodium stearate and about 0.3% to 1.0% oleic acid. The method of forming the body involves shaping the mixture into a green body, drying the green body, and heating to form the product body.

31 Claims, No Drawings

FORMABLE CERAMIC COMPOSITIONS AND METHOD OF USE THEREFOR

This application is a continuation-in-part of U.S. application Ser. No. 07/990,321, filed Dec. 12, 1992 now abandoned.

This invention relates to a plastically deformable mixture and method for forming a body from the mixture. The combination of binder, hydrophilic additive and hydrophobic additive result in very good wetting and lubrication properties and hence less friction both in formation of the mixture and in the formation of the body. More particularly, the mixture is suitable for forming a cordierite body by extrusion into a honeycomb structure.

BACKGROUND OF THE INVENTION

In the formation of ceramic e.g., cordierite bodies, plasticized mixtures are made which are then formed into various shapes. The mixtures must be well blended and homogeneous in order for the resulting shaped body to have good integrity in size and shape, and uniform physical properties. The mixtures have organic additives such as binders, plasticizers, surfactants, lubricants, dispersants as processing aids to enhance wetting and therefore produce a uniform batch. In forming processes, such as in extrusion, high pressures must be exerted on both the plasticized batch material and the equipment, e.g., an extrusion die.

Up to the present time, hydrophilic additives such as sodium stearate, glycerine, and glycols have been used to insure good batch lubrication against the die and other equipment parts thus insuring a long life, good extruded product quality, and low extrusion pressure.

Several of the many U.S. patents that relate to forming cordierite honeycombs by forming batch mixtures of cordierite raw materials are U.S. Pat Nos. 4,772,580, 3,885,977, 4,417,908, 5,114,643, and 5,114,644.

However, there remains an ongoing need to improve upon the lubricating characteristics of the batch material to improve product quality, and the life of processing equipment. Material with better lubrication characteristics would allow less expensive processing equipment to be used instead of the very expensive processing equipment that has to be used today.

SUMMARY OF THE INVENTION

In accordance with one aspect of the invention, there is provided a plastically deformable mixture. The mixture is composed of powder materials which when fired form as predominant phases: ceramic, glass-ceramic, glass, and combinations thereof, 0 to an effective amount of burnout agent, water, organic binder which can be cellulose ether, cellulose ether derivatives or combinations thereof, and hydrophobic and hydrophilic additives to increase the wettability and/or lubricity of the mixture.

In accordance with another aspect of the invention, there is provided a plastically deformable mixture composed of powders, which when fired form predominantly ceramic phases, water, and in percent by weight based on the powders, about 2% to about 8% organic binder which can be methylcellulose, methylcellulose derivatives, and combinations thereof, about 0.3% to about 1.0% sodium stearate, and about 0.5% to about 2.0% oleic acid.

In accordance with another aspect of the invention, there is provided a plastically deformable mixture composed of powders, which when fired form predominantly ceramic phases, about 25% to about 35% by weight graphite based on the powder material, as a burnout agent, water, and in percent by weight based on the powders and the burnout agent, about 2% to about 8% organic binder which can be methylcellulose, methylcellulose derivatives, and combinations thereof, about 0.5% to about 2.5% sodium stearate and about 0.3% to about 1.0% oleic acid.

In accordance with another aspect of the invention, there is provided a method for making a body from the mixture which comprises shaping the mixture into a green body, drying the green body, and heating the green body at a temperature and for a time sufficient to form the product body.

DETAILED DESCRIPTION OF THE INVENTION

The present invention relates to powder batch mixtures which are suitable for forming bodies which have as a predominant phase: ceramic, glass-ceramic, glass, and combinations thereof. The mixtures are characterized in that the combination of components of organic binder, hydrophilic additive, and hydrophobic additive impart very good cohesiveness, wetting, and lubrication to the powder batch materials. As a result, powders are mixed uniformly with less power required, and the mixtures are shaped into bodies with less friction on the material and the equipment than with previous mixtures. Good wetting is manifest in lower energy required for mixing. One way of measuring this is to measure the mixing torque which is roughly proportional to the energy required for mixing. Degree of lubrication can be determined by observing or measuring wear on equipment parts that are used to process the mixtures. One technique of measuring lubricity to illustrate the advantages of the present invention is given in the examples that follow. Additionally, in some cases the properties of the body as far as homogeneity, cohesiveness, skin quality, and knitting are significantly improved. Degree of knitting is an indication of the extent of cracking, such as cracking along the cell wall (web) lines displayed in cross sections of the body of honeycomb structures and fissures in the body. A high degree of knitting is manifested by few or no such cracks visible to the naked eye.

The mixture is made of powders which can be ceramic, glass-ceramic, glass or combinations of these, water, hydrophilic and hydrophobic additives, and water. Optionally, a burn-out agent can be present to obtain porosity desired for efficient filtering such as when the material is made into a filter, as a diesel particulate filter. The hydrophilic and hydrophobic additives are present in amounts effective to increase the wetting and/or lubricity of the mixture which is manifested by a lower torque required for mixing and/or lower pressure required to shape the mixture into a body.

The powder materials are those that when fired include as a predominant phase: ceramic, glass-ceramic, glass, and combinations thereof. By combinations is meant physical or chemical combinations, e.g., mixtures or composites. Examples of these powder materials are cordierite, mullite, clay, talc, zircon, zirconia, spinel, aluminas and their precursors, silicas and their precursors, silicates, aluminates, lithium aluminosilicates, alumina silica, feldspar, titania, fused silica, nitrides, carbides, borides, e.g., silicon carbide, silicon nitride or mixtures of these.

Especially suited are ceramic materials, such as those that yield cordierite, mullite, or mixtures of these on firing, some examples of such mixtures being, for example, about 55% to about 60% mullite, and about 30% to about 45% cordierite, with allowance for other phases, typically up to about 10% by weight. Some ceramic batch material compositions for forming cordierite that are especially suited to the practice of the present invention are those disclosed in U.S. Pat. No. 3,885,977 which is herein incorporated by reference as filed.

In accordance with a preferred embodiment, one composition which ultimately forms cordierite upon firing is as follows in percent by weight, although it is to be understood that the invention is not limited to such: about 33 to about 41, and most preferably about 34 to about 40 of aluminum oxide, about 46 to about 53 and most preferably about 48 to about 52 of silica, and about 11 to about 17 and most preferably about 12 to about 16 magnesium oxide.

The powders can be synthetically produced materials such as oxides, hydroxides, etc, or they can be naturally occurring minerals such as clays, talcs, or any combination of these. The invention is not limited to the types of powders or raw materials. These can be chosen depending on the properties desired in the body.

Some typical kinds of powder materials are given below. The particle size is given as median particle diameter by Sedigraph analysis, and the surface area is given as $N_2$ BET surface area.

Some types of clay are non-delaminated kaolinite raw clay, having a particle size of about 7-9 micrometers, and a surface area of about 5-7 $m^2/g$, such as Hydrite MP ™, those having a particle size of about 2-5 micrometers, and a surface area of about 10-14 $m^2/g$, such as Hydrite PX ™, delaminated kaolinite having a particle size of about 1-3 micrometers, and a surface area of about 13-17 $m^2/g$, such as KAOPAQUE-10 ™, calcined clay, having a particle size of about 1-3 micrometers, and a surface area of about 6-8 $m^2/g$, such as Glomax LL. All of the above named materials are sold by Dry Branch Kaolin, Dry Branch, Ga.

Some typical kinds of talc are those having a particle size of about 6-8 micrometers, and a surface area of about 5-8 $m^2/g$, such as Pfizer talc 95-27, and 95-28.

Some typical aluminas are coarse aluminas, for example, Alcan C-700 series, such as those having a particle size of about 4-6 micrometers, and a surface area of about 0.5-1 $m^2/g$, e.g., C-701 ™, fine alumina having a particle size of about 0.5-2 micrometers, and a surface area of about 8-11 $m^2/g$, such as A-16SG from Alcoa.

One typical kind of silica is that having a particle size of about 9-11 micrometers, and a surface area of about 4-6 $m^2/g$ such as IMSIL ™ sold by Unimin Corporation.

In general, the powder material is fine powder (in contrast to coarse grained materials) some components of which can either impart plasticity, such as clays, when mixed with a vehicle such as water, or which when combined with organic materials such as methyl cellulose or polyvinyl alcohol can contribute to plasticity.

The weight percents of the binder, water, the hydrophobic and hydrophilic additives, are calculated by the following formula:

$$\frac{\text{weight of component}}{100 \text{ weight units of powder material} + \text{burnout agent}} \times 100.$$

The organic binder contributes to the plasticity of the mixture for shaping into a body. The plasticizing organic binder according to the present invention refers to cellulose ether type binders and/or their derivatives some of which are thermally gellable. Some typical organic binders according to the present invention are methylcellulose, ethylhydroxy ethylcellulose, hydroxybutylcellulose, hydroxybutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. Methylcellulose and/or methylcellulose derivatives are typically included as binder components in the practice of the present invention. Preferred sources of methylcellulose and methylcellulose derivatives are Methocel ® A4M and 20-333, F4 and F40 from Dow Chemical Co. Methocel ® A4M is a methylcellulose binder having a gel temperature of 50°-55° C., and a gel strength of 5000 $g/cm^2$ (based on a 2% solution at 65° C.). Methocel ® 20-333, F4, and F40 are hydroxypropyl methylcellulose. Other binder components can be present such as polyvinyl alcohol.

The organic binder content is advantageously about 2% to about 10%, more advantageously about 2% to about 8%, and most advantageously about 2% to about 6%.

The water content can vary depending on the type of materials to impart optimum handling properties and compatibility with other components in the mixture. From a practical standpoint, the water content is usually about 25 to about 40%.

The hydrophilic additive is a forming aid and when present, contributes some lubricity and wetting to a batch. Some typical hydrophilic additives are stearates, glycerine, and glycols. The preferred hydrophilic additive for the purposes of the present invention is sodium stearate.

The upper limit of the hydrophobic additive is dependent on factors as practicality, economics, compatibility with other materials, etc. However, from a practical standpoint, the level of hydrophobic additive is typically no greater than about 50%.

The hydrophobic additive can contribute to the lubricity of the mixture. Those that are especially suited to the practice of the present invention are oleic acid, oleic acid derivatives, and combinations of these. With oleic acid and oleic acid derivatives, it is preferred that they be present at a level of about 0.3% to about 10% by weight, and the water content be about 25% to about 40%. With oleic acid and/or oleic acid derivatives it is advantageous that the hydrophilic additive be sodium stearate at preferred levels of about 0.3% to about 10. Some typical oleic acid derivatives are linoleic acid, linolenic acid, ricinoleic acid, and combinations of these. Most advantageously, the hydrophobic additive is oleic acid.

It is advantageous that both the hydrophilic and hydrophobic additives be present to impart a synergistic effect on batch mixing and lubrication.

It is advantageous that the hydrophobic additive be oleic acid and the hydrophilic additive be sodium stearate.

The above described plastically deformable mixture can be used in any type of forming operation in which the mixture is shaped into a body. However, it is especially advantageous in an extrusion operation which can be any of those known in the art.

For example, the extrusion can be done using a hydraulic ram extrusion press, or a two stage de-airing single auger extruder, or a twin screw mixer with a die assembly attached to the discharge end. In the latter, the proper screw elements are chosen according to material and other process conditions in order to build up sufficient pressure to force the batch material through the die.

Depending on the forming method, and the nature and size of the equipment involved, the specific hydrophilic-hydrophobic combination and the relative amounts of these additives can vary. For example in extrusion operations, these additives can vary depending on the type of extrusion as described above.

For example, in ram extrusion, with a combination of sodium stearate and oleic acid, when no burnout agent is present it has been found advantageous that the weight ratio of oleic acid to sodium stearate be from about 5/1 to about ½ and more advantageously about 2/1 to about 1/1. An advantageous composition is about 0.5% to about 10% oleic acid with about 0.5% to about 2.0% being especially preferred, together with about 0.3% to about 10% sodium stearate with about 0.3% to about 1.0% being especially preferred. But under different conditions such as types of machines used, the additive levels of both oleic acid and sodium stearate, (or any hydrophilic-hydrophobic additives) can be more or less than these amounts.

One especially advantageous composition for ram extrusion of a body without a burnout agent is as follows: powders, which when fired form predominantly ceramic phases, water, and in percent by weight based on the powders, about 2% to about 8% organic binder which can be methylcellulose, methylcellulose derivatives, and combinations thereof, about 0.3% to about 1.0% sodium stearate, and about 0.5% to about 2.0% oleic acid.

In filter applications, such as in diesel particulate filters, it is customary to include a burnout agent in the mixture in an amount effective to obtain the porosity required for efficient filtering. A burnout agent is any particulate substance (not a binder) that burns out of the green body in the firing step. Some types of burnout agents that can be used, although it is to be understood that the invention is not limited to these are organics that are solid at room temperature, elemental carbon, and combinations of these. Some examples are graphite, cellulose, flour, etc. Elemental particulate carbon is preferred. Graphite is especially preferred because it has the least adverse effect on the processing. In an extrusion process, for example, the rheology of the mixture is good when graphite is used. Typically, the amount of graphite is about 10% to about 30%, and more typically about 15% to about 30% by weight based on the powder material.

In ram extrusion of burnout-containing mixtures, especially particulate carbon e.g., graphite mixtures, it is advantageous to have oleic acid at a level of about 0.3% to about 1% and a sodium stearate content of about 0.5% to about 2.5%.

In burnout-containing mixtures, particularly graphite-containing mixtures at the above described levels, it is sometimes advantageous for ram extrusion to include polyvinyl alcohol as co-binder in addition to the methylcellulose and/or methylcellulose derivatives. It is advantageous to have about 2% to about 4% by weight polyvinyl alcohol. It is especially advantageous to have about 2% to about 4% by weight polyvinyl alcohol, and about 4% to about 6% methylcellulose and/or methylcellulose derivatives. In such extrusions, an oleic acid content of about 0.5% and a sodium stearate content of about 2% with polyvinyl alcohol as co-binder results in especially good overall properties of good lubrication, lower friction, good knitting and overall quality in the body.

One especially advantageous composition for ram extrusion of a body for filter applications is as follows: powders, which when fired form predominantly ceramic phases, about 25% to about 35% by weight graphite based on the powder material, as a burnout agent, water, and in percent by weight based on the powders and the burnout agent, about 2% to about 8% organic binder which can be methylcellulose, methylcellulose derivatives, and combinations thereof, about 0.5% to about 2.5% sodium stearate and about 0.3% to about 1.0% oleic acid. Especially suited with this composition is to have about 2% to about 4% polyvinyl alcohol as co-binder, and about 4% to about 6% by weight organic binder.

Some especially suited compositions are given in the examples that follow.

The resulting shaped green body is then dried to remove excess moisture. The drying can be by air, or steam or dielectric drying, which can be followed by air drying.

It is then heated or fired to form the final body. The firing conditions of temperature and time depend on the composition and size and geometry of the body, and the invention is not limited to specific firing temperatures and times. For example, in compositions which are primarily for forming cordierite, the temperatures are typically from about 1300° C. to about 1450° C., and the firing times are from about 1 hour to about 6 hours. For mixtures that are primarily for forming mullite, the temperatures are from about 1400° C. to about 1600° C., and the firing times are from about 1 hour to about 6 hours. For cordierite-mullite forming mixtures which yield the previously described cordierite-mullite compositions, the temperatures are from about 1375° C. to about 1425° C., and the total firing times are from about 20 hours to about 80 hours.

The bodies according to the present invention can have any convenient size and shape. However, the process is especially suited to production of cellular bodies such as honeycombs. Cellular bodies find use in a number of applications such as catalyst carriers, filters such as diesel particulate filters, molten metal filters, regenerator cores, etc.

Some examples of honeycombs produced by the process of the present invention, although it is to be understood that the invention is not limited to such, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or those having about 15 cells/cm$^2$ (about 100 cells/in$^2$). These bodies are made preferably of, but not limited, to ceramic materials which when fired form cordierite, mullite or combinations thereof. Typical wall thicknesses in catalytic converter applications, for example, are about 0.15 mm (about 6 mils) for about 62 cells/cm$^2$ (about 400 cells/in$^2$) honeycombs. Wall (web) thicknesses range typically from about 0.1 to about 0.6 mm (about 4 to about 25 mils). The external size and shape of the body is controlled by the application, e.g. engine size and space available for mounting, etc. Honeycombs having about 15 to about 30 cells/cm² (about 100 to about 200 cells/in²) and about 0.30 to about 0.64 mm (about 12 to about 25 mil) wall thicknesses are especially suited for diesel particulate filter applications.

Some compositions of the present invention are especially useful in forming particular types of honeycomb bodies. This will be shown in the examples that follow.

To more fully illustrate the invention, the following non-limiting examples are presented. All parts, portions, and percentages are on a weight basis unless otherwise stated.

The additions of oleic acid, sodium stearate, carbon, and binders are given as percent, based on the powder material and burnout agent (if present), according to the formula given previously.

EXAMPLE 1

The approximate ceramic batch composition is as follows:

About 40.8% talc, (preferably fine talc, e.g., Pfizer 95-27)
About 30.87% calcined clay e.g., Glomax LL
About 14.8% raw clay e.g., KAOPAQUE-10 from Dry Branch Kaolin
Balance alumina A-16SG from Alcoa The batch materials and various combinations of oleic acid and sodium stearate, about 31.8% water, and about 2.9% hydroxypropylmethyl cellulose, F40M from DOW are mixed in a Brabender for about 2 minutes at room temperature at about 50 rpm. Torque is measured, the torque being approximately proportional to the energy required for mixing. Each mixture is extruded and the extrusion pressure is measured and recorded as PSI. Lubricity is measured for each mixture by passing each mixture through a 25 ton ram extruder at a constant pressure of about 2000 psi and then through an apparatus which comprises a container for centering a smooth steel rod, the apparatus being attached to the extruder. Flow rate of each mixture is measured. Lubricity is measured by dividing the flow rate of the mixture by the flow rate of one of the mixtures which serves as a reference. The result is a relative value and reported as $\beta$. The higher the $\beta$ value, the better is the lubrication or the lower the friction.

TABLE 1

| No. | Additive | % | Torque | PSI | $\beta$ |
|---|---|---|---|---|---|
| 1-1 | — | — | 7100 | 750 | 0.008 |
| 1-2 | oleic acid | 0.38 | 5600 | 575 | 0.13 |
| 1-3 | oleic acid | 0.75 | 4700 | 425 | 0.51 |
| 1-4 | oleic acid | 1.13 | 3800 | 325–350 | 1.74 |
| 1-5 | oleic acid | 2.25 | 3200 | 275–350 | 2.79 |
| 1-6 | Na stearate | 0.38 | 5050 | 500 | 0.58 |
| 1-7* | Na stearate | 0.75 | 3750 | 425–450 | 0.89 |
| 1-8 | Na stearate | 1.13 | 3500 | 375–400 | 1.32 |
| 1-9 | Na stearate | 2.25 | 3500 | 400 | 1.59 |
| 1-10 | oleic acid | 0.75 | 3300 | 325 | 2.02 |
|  | Na stearate | 0.38 |  |  |  |
| 1-11 | oleic acid | 0.75 | 3050 | 325 | 2.09 |
|  | Na stearate | 0.75 |  |  |  |

*Control

The data show that with increasing amounts of oleic acid, the lubrication properties imparted to the batch are significant as shown by the low extrusion pressure and the higher $\beta$ values. Also, ease of mixing is evident as shown by the decreasing torque values. The batch cohesiveness, (toughness) is also enhanced with increasing oleic acid levels. The mixed oleic acid-sodium stearate systems, No. 10 and 11 show a very strong synergistic effect. The mixed system is much more efficient than either oleic acid alone or sodium stearate alone in imparting both good lubrication and mixing results at comparable respective levels of these additives. The mixed system also retains some of the good cohesiveness of an oleic acid batch.

EXAMPLE 2

The approximate ceramic batch composition is as follows:

About 40.2% talc, (preferably fine talc, e.g., Pfizer 95-28)
About 21.2% calcined clay e.g., Glomax LL
About 25.2% raw clay e.g., hydrite MP
Balance alumina C701 Alcan The procedure of Example 1 is followed with varying amounts of oleic acid and sodium stearate. The results are given in Table 2 below.

TABLE 2

| No. | Additive | % | Torque | PSI | $\beta$ |
|---|---|---|---|---|---|
| 2-1* | Na stearate | 2.5 | 3200 | 625–750 | 0.44 |
| 2-2 | oleic acid | 2.5 | 3200 | 500–550 | 1.2 |
| 2-3 | oleic acid | 1.5 | 2850 | 525–575 | 1.36 |
|  | Na stearate | 1.0 |  |  |  |
| 2-4 | oleic acid | 2.0 | 2850 | 500–550 | 1.51 |
|  | Na stearate | 1.0 |  |  |  |

*Control

The mixed oleic acid-sodium stearate systems, Nos. 2-3 and 2-4 show lower mixing torque and extrusion pressure, and higher lubricity than either oleic acid or sodium stearate alone, (2-1 and 2-2).

EXAMPLE 3

The ceramic batch composition is as follows:
About 24.5% calcined clay e.g., Glomax LL
About 19.7% raw clay, e.g., Georgia Kaolin hydrite PX
Balance alumina C701 Alcan The batch materials and various combinations of oleic acid and sodium stearate and about 23% water and about 3% methyl cellulose A4M are mixed as in Example 1 and extruded through a 2.54 cm (1") die into honeycombs of about 47 cells/cm², (about 300 cells/in²) with wall thicknesses of 10.5 mils (about 0.27 mm). Lubricity and mixing are measured as in Example 1. The pieces are examined visually for cracks, and integrity of the outer skin. The results are given in Table 3 below.

TABLE 3

| No. | Additive | % | Torque | PSI | Quality |
|---|---|---|---|---|---|
| 3-1 | — | — | 7600 | 950* | Poor |
| 3-2 | oleic acid | 0.5 | 4700 | 975 | Poor |
| 3-3 | oleic acid | 1.0 | 3500 | 725 | Very Good |
| 3-4 | oleic acid | 2.0 | 3200 | 625 | Nearly Perfect |
| 3-5** | Na stearate | 0.5 | 4050 | 700* | Fair |
| 3-6 | Na stearate | 1.0 | 3100 | 625* | Very Good |
| 3-7 | Na stearate | 2.0 | 3500 | 775 | Perfect |
| 3-8 | oleic acid | 1.0 | 2900 | 690 | Perfect |
|  | Na stearate | 0.5 |  |  |  |

*Lower Ram Speed
**Control

It can be seen that the combination of oleic acid and sodium stearate (3-8) gives lower mixing torques and extrusion pressure and better quality than either of these alone. Again, the batch cohesiveness (toughness) is enhanced with increasing oleic acid levels.

EXAMPLE 4

The ceramic batch composition is as follows:
About 40.2% talc, preferably fine talc, e.g., Pfizer 95-28
About 21.2% calcined clay e.g., Glomax LL
About 25.2 raw clay e.g., hydrite MP
Balance alumina C701 Alcan
About 30% carbon, e.g., graphite (based on the total ceramic material)

The ceramic materials and carbon are mixed with about 4% methyl cellulose, (A4M) and about 28% water. Various amounts of sodium stearate and oleic acid are added. The combinations are mixed in a Brabender for about 2 minutes at room temperature at about 50 rpm and measured for degree of mixing as in the other examples. The mixtures are extruded through a 2.54 cm (1") die, to form bodies having about 15 cells/cm$^2$ (about 100 cells/in$^2$) and wall thicknesses of about 0.6 mm. The extrusion pressure is measured. The body is cut into 2 17.8 cm (7") long sections and dried at ambient conditions. The knitting power of a batch in a cellular substrate is judged from the extent of splitting/cracking developed along cell wall lines in three freshly cut cross sections (neglecting the frontal section of the extruded piece) as the sections are dried overnight. The results are given in Table 4.

TABLE 4

| No. | Additive | % | Torque | PSI | Skin | Knitting |
|---|---|---|---|---|---|---|
| 4-1 | Na stearate* | 0.5 | 2900 | 750 | Perfect | Poor |
| 4-2 | Na stearate | 1.5 | 2850 | 675 | Perfect | Poor |
| 4-3 | oleic acid | 1.0 | 2850 | 600 | Perfect | Poor |
|  | Na stearate | 0.5 |  |  |  |  |
| 4-4 | oleic acid | 0.5 | 2850 | 725 | Worst | Poor |
|  | Na stearate | 1.0 |  |  |  |  |
| 4-5 | Na stearate | 2.0 | 2900 | 700 | Many Holes | Poor |
| 4-6 | oleic acid | 0.5 | 2450 | 525 | Perfect | Poor |
|  | Na stearate | 1.5 |  |  |  |  |
| 4-7 | Na stearate | 2.5 | 2900 | 625 | Perfect | Poor |
| 4-8 | oleic acid | 2.0 | 2650 | 500 | Some Holes | Poor |
|  | Na stearate | 0.5 |  |  |  |  |
| 4-9 | oleic acid | 1.0 | 2550 | 525 | A Few Holes | Poor |
|  | Na stearate | 1.5 |  |  |  |  |
| 4-10 | oleic acid | 0.5 | 2550 | 525 | Perfect | Very Good |
|  | Na stearate | 2.0 |  |  |  |  |

*Control

In the runs with sodium stearate alone, the level of sodium stearate does not appreciably affect the mixing torque, skin quality and extent of knitting. However, with mixed oleic acid-sodium stearate systems, the effect on torque, pressure, and knitting is significant with increasing levels of these additives. With total additive levels of about 2.0%, (No. 6), the effect can be seen as far as lower torque, and pressure and better quality overall, when compared with a control of 2.0% sodium stearate only, (No. 5). However, there is no improvement in knitting at the 2% level. At levels of about 2.5%, the mixed additive systems, (Nos. 8, 9, and 10) show improvement as far as much lower mixing torque and extrusion pressure as compared to the control No. 7. This is especially evident in No. 10, which is lean with respect to oleic acid in the mixed system and yields a perfect skin quality and very good knitting. Without being bound by theory, it is believed that the high synergistic effects of an oleic acid lean mixed system of the present invention is accounted for by the presence of carbon powder in the mixture.

EXAMPLE 5

The procedure of Example 4 is followed with the ceramic material, graphite, and methyl cellulose (A4M) content being the same as in Example 4. The water content is about 28%. A polyvinyl alcohol co-binder, Airvol 205S from Air products, and methyl cellulose A4M type binders are added to the above material with the oleic acid and sodium stearate contents being:
 1. Sodium stearate—about 0.5%—"control"
 2. Oleic acid—about 0.5% Sodium stearate—about 2%.—"mixed"

Results are given in Table 5 below.

TABLE 5

| No. | System | Binder | % | Torque | PSI | Skin | Knitting |
|---|---|---|---|---|---|---|---|
| 5-1 | Mixed | Methyl-Cellulose | 4 | 2550 | 525 | Perfect | Very Good |
| 5-2 | Mixed | Methyl-Cellulose PVA | 4 2 | 3500 | 600 | Perfect | Very Good |
| 5-3 | Control | Methyl-Cellulose PVA | 4 2 | 4100 | 650 | Perfect | Poor |
| 5-4 | Mixed | Methyl-Cellulose PVA | 4 4 | 3900 | 625 | Perfect | Excel |
| 5-5 | Control | Methyl-Cellulose PVA | 4 4 | 4650 | 700 | Many Holes | Poor |
| 5-6 | Mixed | Methyl-Cellulose | 6 | 3750 | 625 | Perfect | Good |
| 5-7 | Control | Methyl-Cellulose | 6 | 4900 | 800 | Many Holes | Poor |

Here it can be seen again that the mixed oleic acid-sodium stearate composition is superior to the control with respect to torque, pressure, and degree of knitting within a given binder system. As far as the binder, it can be seen that levels of polyvinyl alcohol and methyl cellulose of about 4% each (No. 4) result in the best quality of the body as far as being well-knitted and having no splitting in any cross section. An increase in methyl cellulose to about 6%, and a level of about 2% PVA and about 4% methyl cellulose (Nos. 6 and 2 respectively) result in about the same level in good knitting in mixed systems. These results show that the combined level of binders PVA (2–4%) and methyl cellulose at levels of about 4 to about 6% with a mixed oleic acid-sodium stearate system that is lean with respect to oleic acid, are optimum as far as the total properties of torque, pressure, knitting, and quality of the body.

It should be understood that while the present invention has been described in detail with respect to certain illustrative embodiments thereof, it should not be considered limited to such but may be used in other ways without departing from the spirit of the invention and the scope of the appended claims.

What is claimed is:

1. A plastically deformable mixture capable of being shaped into a body, said mixture comprising
   powders, which when fired form predominant phases selected from the group consisting of ceramic, glass-ceramic, glass, and combinations thereof,
   0 to an effective amount of burnout agent to obtain the porosity required for efficient filtering, water,
organic binder comprising components selected from the group consisting of cellulose ethers, cellulose ether derivatives, and combinations thereof,
at least some hydrophilic additive, and
at least some hydrophobic additive,
said hydrophilic and hydrophobic additives being present in amounts effective to increase the wettability and/or lubricity of said mixture.

2. The mixture of claim 1 wherein the organic binder is selected from the group consisting of methylcellulose, methylcellulose derivatives, and mixtures thereof.

3. The mixture of claim 2 wherein the organic binder content is about 2% to about 10% by weight based on the powders and the burnout agent.

4. The mixture of claim 3 wherein said binder content is about 2% to about 8%.

5. The mixture of claim 1 wherein the hydrophilic additive is selected from the group consisting of stearates, glycerine, glycols, and combinations thereof.

6. The mixture of claim 5 wherein the hydrophilic additive is sodium stearate.

7. The mixture of claim 1 wherein the hydrophobic additive is selected from the group consisting of oleic acid, oleic acid derivatives, and combinations thereof.

8. The mixture of claim 7 wherein the hydrophobic additive content is about 0.3% to about 10% by weight based on the powders and burnout agent.

9. The mixture of claim 7 wherein the hydrophobic additive is oleic acid.

10. The mixture of claim 7 wherein the hydrophilic additive is sodium stearate.

11. The mixture of claim 10 wherein the sodium stearate content is about 0 3% to about 10% by weight based on the powders and burnout agent.

12. The mixture of claim 10 wherein the hydrophobic additive is oleic acid.

13. The mixture of claim 10 wherein the burnout agent content is 0.

14. The mixture of claim 13 wherein the hydrophobic additive is oleic acid, and the weight ratio of oleic acid to sodium stearate is about 5/1 to about ½.

15. The mixture of claim 14 wherein said weight ratio is about 2/1 to about 1/1.

16. The mixture of claim 13 wherein the hydrophobic additive is oleic acid, the oleic acid content is about 0.5% to about 10%, and the sodium stearate content is 0.3 to about 10% by weight based on the powders and burnout agent.

17. The mixture of claim 16 wherein the oleic acid content is about 0.5% to about 2.0%, and the sodium stearate content is about 0.3% to about 1.0%.

18. The mixture of claim 10 wherein the burnout agent content is greater than 0.

19. The mixture of claim 18 wherein the burnout agent is particulate carbon.

20. The mixture of claim 19 wherein the hydrophobic additive is oleic acid, and the oleic acid content is about 0.5% to about 2%, and the sodium stearate content is about 0.5% to about 4% by weight based on the powders and burnout agent.

21. The mixture of claim 20 wherein the mixture contains in percent by weight based on the powder material and the burnout agent about 2% to about 4% polyvinyl alcohol as co-binder, and about 4% to about 6% by weight organic binder, wherein the organic binder is selected from the group consisting of methylcellulose, methylcellulose derivatives, and combinations thereof.

22. The mixture of claim 21 wherein the oleic acid content is about 0.5%, and the sodium stearate content is about 2%.

23. The mixture of claim 1 wherein the water content is about 25% to about 40% by weight based on the powder material and the burnout agent.

24. The mixture of claim 1 wherein the predominant phases are ceramic phases.

25. The mixture of claim 24 wherein the ceramic phases are selected from the group consisting of cordierite, mullite, and combinations thereof.

26. A plastically deformable mixture capable of being shaped into a body, said mixture comprising
powders, which when fired form predominantly ceramic phases,
water,
and in percent by weight based on the powders,
about 2% to about 8% organic binder comprising components selected from the group consisting of methylcellulose, methylcellulose derivatives, and combinations thereof,
about 0.3% to about 1.0% sodium stearate as a hydrophilic additive, and
about 0.5% to about 2.0% oleic acid as a hydrophobic additive.

27. A plastically deformable mixture capable of being shaped into a body, said mixture comprising
powders, which when fired form predominantly ceramic phases,
about 25% to about 35% by weight graphite based on the powder material, as a burnout agent,
water,
and in percent by weight based on the powders and the burnout agent,
about 2% to about 8% organic binder comprising components selected from the group consisting of methylcellulose, methylcellulose derivatives, and combinations thereof,
about 0.5% to about 2.5% sodium stearate as a hydrophilic additive, and
about 0.3% to about 1.0% oleic acid as a hydrophobic additive.

28. The mixture of claim 27 wherein the mixture contains in percent by weight based on the powder material and the burnout agent about 2% to about 4% polyvinyl alcohol as co-binder, and about 4% to about 6% by weight organic binder.

29. A method for forming a body, said method comprising:
a) providing the mixture of claim 1;
b) shaping said mixture into a green body;
c) drying said green body; and
c) heating said green body at a temperature and a time sufficient to form said body.

30. The method of claim 29 wherein said shaping is done by extruding said mixture.

31. The method of claim 29 wherein said body is a honeycomb structure.

* * * * *

UNITED STATES PATENT AND TRADEMARK OFFICE
CERTIFICATE OF CORRECTION

PATENT NO. : 5,344,799
DATED : September 6, 1994
INVENTOR(S) : Shy-Hsien Wu

It is certified that error appears in the above-indentified patent and that said Letters Patent is hereby corrected as shown below:

Col. 11, line 34, "0 3%" should    Claim 11
be "0.3%"

Signed and Sealed this

Seventeenth Day of January, 1995

Attest:

BRUCE LEHMAN

Attesting Officer    Commissioner of Patents and Trademarks